March 11, 1947. M. W. MAGANN ET AL 2,417,370

FOUNTAIN BRUSH

Filed Dec. 13, 1944

Merritt W. Magann,
William A. McElvain,
Inventors.
Haynes and Koenig
Attorneys.

Patented Mar. 11, 1947

2,417,370

UNITED STATES PATENT OFFICE 2,417,370

FOUNTAIN BRUSH

Merritt W. Magann, St. Louis, and William A. McElvain, Maplewood, Mo., assignors to Diagraph-Bradley Stencil Machine Corporation, St. Louis, Mo., a corporation of Missouri Application December 13, 1944, Serial No. 567,922

10 Claims. (Cl. 15—138)

This invention relates to fountain brushes, and with regard to certain more specific features, to valved feed fountain stencil brushes.

Among the several objects of the invention may be noted the provision of a fountain stencil brush in which the control parts of a valve for controlling ink feed, though operative from the outside, are freely movable but positively protected against leakage and clogging; the provision of a brush of the class described which has less tendency than usual to vacuum binding; the provision of a brush of the class described which has an improved operating touch; and the provision of a valved brush of this class which is simple in construction, easy to assemble and disassemble, reliable in operation and easy to clean. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a plan view of one form of the brush;

Fig. 2 is a vertical section taken on line 2—2 of Fig. 1;

Fig. 3 is a horizontal section taken on line 3—3 of Fig. 2;

Fig. 4 is a fragmentary view similar to parts shown at the lower end of Fig. 3 but enlarged and showing an open position of a valve;

Fig. 5 is a fragmentary vertical section taken on line 5—5 of Fig. 2;

Fig. 6 is a view similar to Fig. 4 but showing an alternative form of the invention; and, Fig. 7 is a fargmentary detail taken on line 7—7 of Fig. 6.

Similar reference characters indicate corresponding parts throughout the several views of the drawings.

Referring now more particularly to Figs. 1–5, numeral 1 indicates a main body provided at its normally lower end with a threaded counterbore 3 for the removable reception of the threaded ferrule 5 of a standard brush assembly 7. Between the brush assembly 7 (including its ferrule 5) and the top of the counterbore is a packing gasket 9. The body 1 is formed as a hexagon 11 around the counterbore 3.

The body 1 is also provided with an upper threaded counterbore 13. At the bottom of this counterbore 13 is a seat 15 for a gasket 17. Upon the gasket rests the rim of a downwardly bulged snap-acting spring disc 19. This disc is normally bulged downward toward a follower pin 21 which is slidable in a hole through the bottom of the counterbore. The pin 21 is chamfered at its lower end where it is engaged by a conical cam portion 23 of a control stem 25. The portion 23 acts as a wedge, and the pin 21 as a follower on the wedge. The stem 25 is slidable in a crossbore 27 and for exterior control has a portion extending from the body 1. Extending inward from the cam portion 23 of the stem 25 is an extension 29, part of which is formed as a collar 31. This collar forms a sliding alignment guide in the bore 27 and also, in connection with the pin 21, forms an interlock against outward movement of the pin 25. A spring 33, reacting between the end of the bore 27 and the collar 31, serves to bias the stem assembly outward, but the pin 21 prevents complete outward movement. By pressing the stem 25 inward, the cam 23 raises the pin 21 so as to actuate the spring disc 19 from the position shown in Fig. 2 to the raised position shown in Fig. 4. The disc 19 tends to snap from its lower to its upper bowed position.

The margin of the disc 19 is held down against the gasket 17 by means of a flange 35 of a valve-supporting spider 37. The spider 37 is flanged at 38 and threaded for insertion into the threaded counterbore 13 to a point where the flange 35 holds in place the disc 19. The lower end 39 of a reservoir cylinder 41 is also threaded into the counterbore 13 and seats against the top of the surface of the spider 37. The upper end of this cylinder is closed by a cap 59. A gasket 40 is preferably under cylinder 41 to guard against leakage.

In the center of the spider 37 is a short passage 43 for a valve 45 which has a stem 47 engaging the center of the disc 19. This valve is in a counterbore 49 formed in an upwardly extending portion 51, the latter also forming part of the spider 37. On its outside the portion 51 is made hexagonal (Fig. 1) for wrench-engaging purposes. The top of the valve 45 is flanged as shown at 53 for seating a compression spring 55 which at its upper end reacts against a removable cotter pin 57 passing through suitable openings in the cylinder 51. The spring 55 normally biases the valve shut (Fig. 2) but when the stem 25 is pushed in the cam 23 lifts the pin 21, which in turn lifts the center of the disc 19, thus forcing open the valve 45 against the action of the spring 55. Release of the stem 25 again permits the spring 55 to close the valve, while spring 33 returns the stem 25 to the Fig. 2 position. The collar 31 prevents the stem 25 for springing out of the opening 27.

The valve 45 has for its purpose the control of the flow of ink from the reservoir 41 to the brush 7. For this purpose, multiple openings 61 are provided through the cylinder 51 above the opening 43. Below the opening 43 multiple openings 63 are provided in the flange 35. All of the openings 61, 43, 63 are above the disc 19. Thus the disc 19 acts as a solid though flexible diaphragm or dam against escape of ink to the operating pin 21 and stem 25.

From passages 63 the ink finds its way to the brush 7 by way of one of the passages 65 shown in Fig. 5. The plane of the passages 65 is perpendicular to the plane of the section shown in Figs. 2 and 4. Thus it is clear that the disc, stem 25 and associated operating parts are by-passed by the ink and that no packing members are needed in association with the stem 25. Hence this stem may be operated freely without leakage around the stem. In other words, the fit between stem 25 and its opening 27 may be loose as desired for a proper touch.

Not only does the invention provide for better touch by free action of the stem 25 without leakage around it, but it provides the snap action of the disc 19 which is a tactual signal that the valve has been operated to the proper extent.

Filling is effected by inverting the cylinder 41, loading it with ink, and then threading onto it the body 1 while the latter is inverted. Then when the brush is turned upright the parts are as shown in Fig. 2. By pressing upon the stem 25 from time to time, the pin 21 is lifted to cause the disc 19 to snap upward into the position shown in Fig. 4 whereupon a charge of ink flows down from the compartment 41, through the openings 61, 43, 63 and through one of the openings 65 to the brush 7. Since in general the brush is operated with some slight tilt, most of the ink will find its way down through only one of the passages 65 and the other will act as an inlet for air to break the vacuum formed by escape of ink from the compartment 41.

Although the outflowing ink and the incoming air must all pass through the passage 43, this passage is short and easily admits air. This is not always true in the case of single long passages and it is for this reason that the two passages 65 are used, one of which will tend to carry air and the other liquid.

Assembly and disassembly of the device are quite easy. When empty it may readily be cleaned by unscrewing the reservoir 41 and then unthreading the spider assembly. To facilitate this, the outside of the cylinder 51 is made hexagonal as above noted and indicated by dotted lines in Fig. 1. The disc 19 may then readily be removed and if necessary the disc 19 and gasket 17 may be replaced. After removal of the assembly 37 and disc 19, the pin 21 may be released by slightly pushing in the stem 25 and turning the body 1 upside down. Pin 21 will then drop out. With the pin 21 removed, the stem 25 is automatically pushed out of the body 1 by means of the spring 33. The valve 45 may be removed from the cylinder 51 by removing the cotter pin 57. Reassembly is equally easy by reversing the above process.

In Figs. 6 and 7 an alternative form of the invention is shown. In this case, spider parts are not used but the body 71 (which is the equivalent of body 1) is provided with a cross passage 73 enclosed at one end by a threaded plug 75 which backs a spring 77. The latter presses upon a guide 79 into which is threaded an extension 81 from a stem 83. The operating end of the stem 83 is located behind a snap-acting spring disc 85. The edge of this disc 85 is held and sealed in a groove 87 of a recess 89. Between the pin 81 and the stem 83 is a conical cam 91.

Crosswise of the passage 73 and vertically located is a passage 93 at the lower end of which is a valve seat 95 for a loose valve stem 97. The latter has an opening 99 through it. This opening is elongate vertically. The valve stem 97 is normally biased to the seat 95 by means of compression spring 101 backed up by a plug 103 in which is feed opening 105.

Operation of this alternative form of the invention is brought about simply by pressing upon the disc 85. Its snap action forces in the stem 83 and causes the cam 91 to open the valve to allow ink to flow to the brush. Ink enters the opening 105 and the valve 97 is loose enough in its passage to pass ink around it. The springs 77 and 101 return the parts to the closed positions when pressure is released from the snap-acting disc 85. Disc 85 then springs back to the position shown in Fig. 6.

While the alternative form of the invention is mechanically simpler than the preferred form, it does not protect the operating stem from the ink. However, it does positively assure that there will be no leakage to the exterior of the device from around the stem. Ink only reaches the exterior through the brush 7. This alternative form of the invention has the same desirable operating touch as the preferred form, in view of the preferred snap-acting character of the spring disc 85.

In lieu of this loose fit of valve 97, it may be made with a tighter fit in the passage 93 and the valve vertically splined for ink flow while open.

It will be understood that the flexible diaphragms or discs 19 or 85 are generally made of spring metal, but that other material may be used such as plastic, rubber, and the like.

It will be observed that in the form of the invention shown in Figs. 1–5, the flexible diaphragm or disc 19 forms a flexible liquid retaining wall of the liquid passage behind which is the valve and through which the valve is operated from the stem 25 and pin 21. This protects the stem and pin from the liquid. In the form of the invention shown in Figs. 6 and 7, the flexible diaphragm or disc 85 also forms a flexible wall which retains liquid, but in this case the stem 83 and valve 97 are on the liquid side of the diaphragm, instead of on the opposite side as in Figs. 1–5.

The form of the invention shown in Figs. 6 and 7 is described and claimed in our copending U. S. patent application Serial No. 712,510, filed November 27, 1946, for Fountain brush.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In a fountain brush having a body with attached reservoir and brush, means providing a passage between the reservoir and the brush, a valve in the passage, a liquid-tight diaphragm in the body capable of movement which is adapted to operate the valve, and operating means on the side of the diaphragm opposite the valve and extending to a point exteriorly of the body for actuating the valve through the diaphragm, said diaphragm positively protecting said operating means from liquid.

2. In a fountain brush having a body with attached reservoir and brush, means providing a passage between the reservoir and the brush, a valve in the passage normally biased toward closed position, a diaphragm in the body capable of movement which is adapted to operate the valve, and cam-actuated operating means on the side of the diaphragm opposite the valve and reaching to a point exteriorly of the body for actuating the valve through the diaphragm, said diaphragm positively protecting said operating means from liquid.

3. A fountain brush comprising a body having a brush attached at one end, means at the other end including a seat, a diaphragm resting on said seat, a removable spider assembly holding the margin of said diaphragm to said seat, said spider including a valve seat and a valve, the latter being normally spring-biased to said seat and having a portion adapted to be operatively engaged by the diaphragm to be opened thereby, a reservoir attached to said body and enclosing the spider, the spider and body having passages adapted to lead liquid from the reservoir to the brush without leading it to the side of the diaphragm opposite its valve side, movable means on the side of the diaphragm opposite the valve for operating the diaphragm, a movable member for operating said last-named means, said operating member extending to a point outside of the body portion for manual manipulation.

4. A fountain brush comprising a body portion having a brush attached at one end and a threaded recess at the other end, a seat at the base of said recess, a flexible diaphragm resting on said seat, a removable spider assembly threaded into said recess, said spider assembly including a valve seat and a valve, the latter being normally spring-biased to said seat in the spider and having a portion adapted to be operatively engaged by the diaphragm to be opened thereby, an axial reservoir threaded into said recess and enclosing the spider, said spider and body portions having passages adapted to lead liquid from the reservoir to the brush without leading it to the side of the diaphragm opposite its valve side, a pin movable in the body and coaxial with the valve and the reservoir, said body having a lateral passage below the diaphragm, a stem in said passage operative from the outside of the body, said stem including a cam cooperating with said pin.

5. A fountain brush comprising a body portion having a brush attached at one end and a threaded recess at the other end, a seat at the base of said recess, a flexible diaphragm on said seat, a removable spider assembly threaded into said recess and holding the diaphragm, said spider assembly including a valve seat and a valve, the latter being normally spring-biased to said seat in the spider and having a portion adapted to be operatively engaged by the diaphragm to be opened thereby, a reservoir threaded into said recess and enclosing the spider, said spider and body portions having passages adapted to lead liquid from the reservoir to the brush without leading it to the outside of the diaphragm opposite its valve side, a pin movable in the body on said outside of the diaphragm for operating the latter, a passage outside the diaphragm, a stem in said passage operative from the outside of the body, said stem including a cam cooperating with said pin, spring means biasing said stem so as to move the cam away from the pin, and means on the stem engageable with said pin to form an interlock normally to prevent complete movement of the stem from the body.

6. In a fountain brush having a valve control passage between a reservoir and a brush thereon, the passage being constituted by a relatively short single-passage portion adjacent the valve, and relatively longer plural-passage portions from said single-passage portion to the brush, a diaphragm for operating the valve, an operating mechanism for the diaphragm on its side opposite that of the valve and operable from the exterior, said diaphragm positively sealing its valve side from its other side, said plural passages bypassing the diaphragm and the operating mechanism.

7. A fountain brush comprising a body having a liquid-receiving brush on one side and a liquid reservoir on the other side with liquid passages therebetween, a spring-closed valve controlling the passages, a flexible diaphragm forming a wall of the passages and enclosing the valve on its liquid side, said body including on the other side of the diaphragm a recess extending to the outside of the body, and manually controlled operating means extending into the recess from the outside of the body and adapted to actuate the diaphragm to control said valve.

8. A fountain brush comprising a body having a liquid-receiving brush on one side and a liquid reservoir on the other side with liquid passages therebetween, a spring-closed valve controlling the passages, a flexible snap-acting diaphragm forming a wall of the passages and enclosing the valve on its liquid side, said body including on the other side of the diaphragm a recess extending to the outside of the body, and manually controlled operating means extending into the recess from the outside of the body and adapted to actuate the diaphragm to control said valve.

9. A fountain brush comprising a body having a normally downwardly extending brush and an upwardly extending elongate reservoir, said body having passages for liquid extending from the reservoir to the brush, a flexible disc marginally supported with its general plane normal to the length of the reservoir and forming a wall of said passages, an axially movable valve controlling the passage and normally biased toward closed position and having a portion cooperating with the diaphragm whereby the valve may be actuated from said diaphragm, a movable pin engaging the other side of the diaphragm to operate the diaphragm and thus the valve, said body having a transverse passage, and means movable in the transverse passage for moving said pin and extending from the body for exterior manual operation.

10. A fountain brush comprising a body having a normally downwardly extending brush and a normally upward threaded counterbore for a substantially cylindric reservoir, a snap-acting flexible disc supported at the base of said counterbore, a spider threaded into said counterbore and having a clamping engagement with the margin of the disc to make the latter liquid-tight, said spider having a liquid passage connecting the reservoir with the top of the diaphragm, said body having a liquid passage communicating from the top of the diaphragm to the brush, an axially movable valve in the spider, said valve being spring-biased toward closure and having a part in cooperation with the diaphragm, an axially movable pin below the diaphragm and engageable therewith for operation, and a laterally movable control member in said body operable from the exterior and having means cooperating with said pin to move the latter and thus to move the valve.

MERRITT W. MAGANN.
WILLIAM A. McELVAIN.

REFERENCES CITED

The following references are of record in the file of this patent:

UNITED STATES PATENTS

| Number | Name | Date |
|---|---|---|
| 2,087,301 | Remnsnider | July 20, 1937 |
| 2,236,625 | March et al. | Apr. 1, 1941 |
| 2,255,879 | Garvey | Sept. 16, 1941 |
| 1,534,357 | Burnett | Apr. 21, 1925 |
| 1,292,288 | Fisher | Jan. 21, 1919 |